May 5, 1964 W. H. DREYER ETAL 3,131,857
PERFORATING APPARATUS
Filed Jan. 3, 1962 10 Sheets-Sheet 1
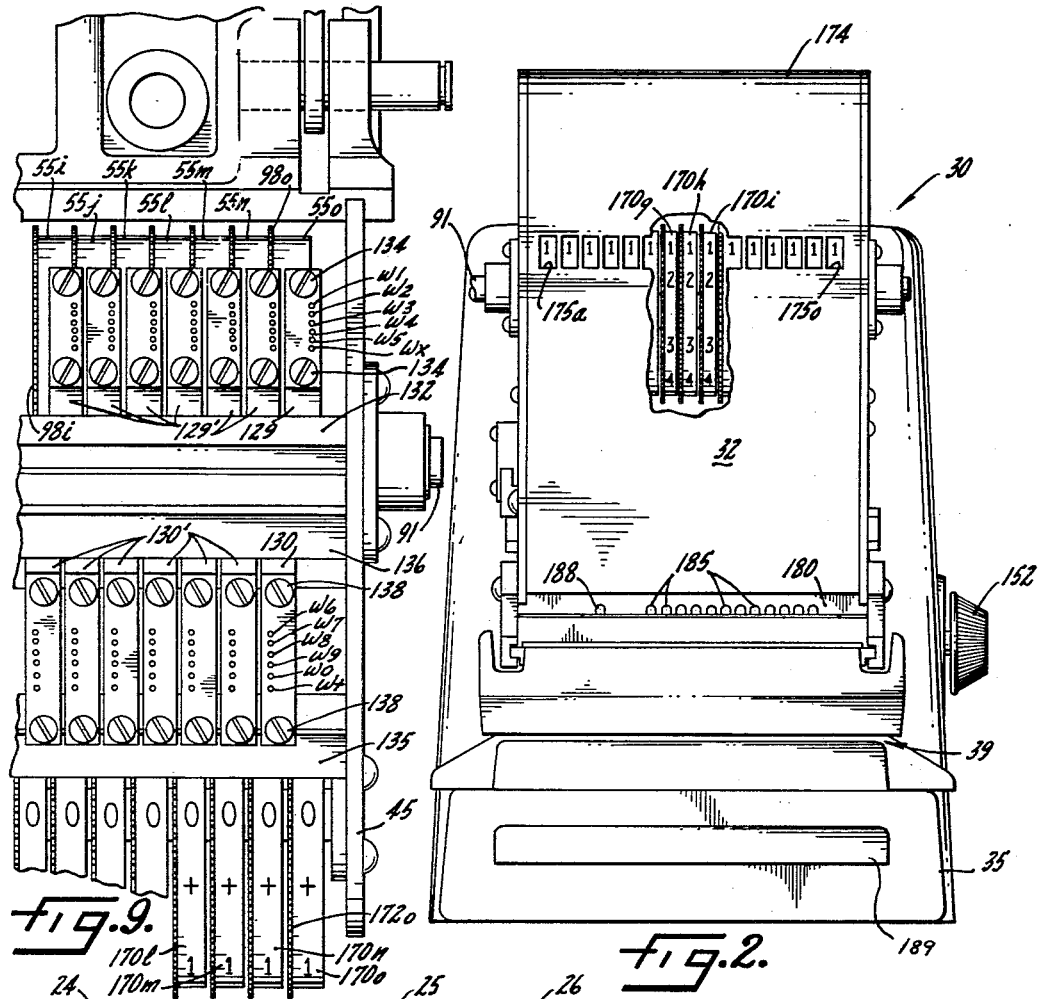
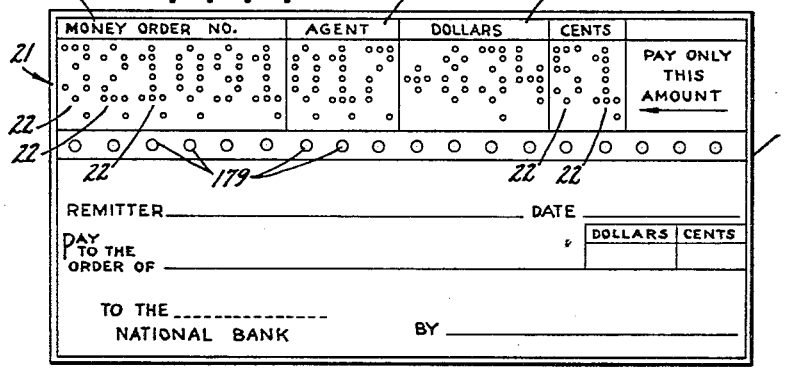
INVENTORS
JAMES L. QUINN
BY WILLIAM H. DREYER
Wolfe, Hubbard, Voit & Osann
Attorneys.

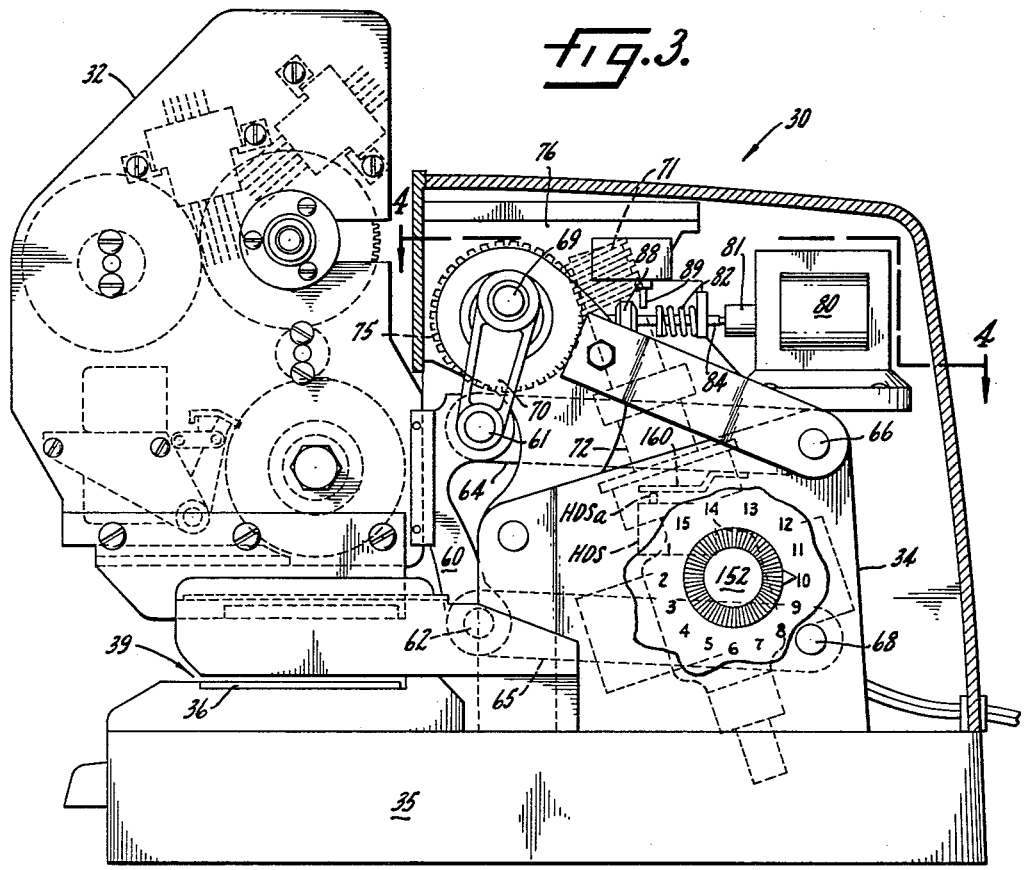

INVENTORS
JAMES L. QUINN
WILLIAM H. DREYER
BY
Wolfe, Hubbard, Voit & Osann
Attorneys.

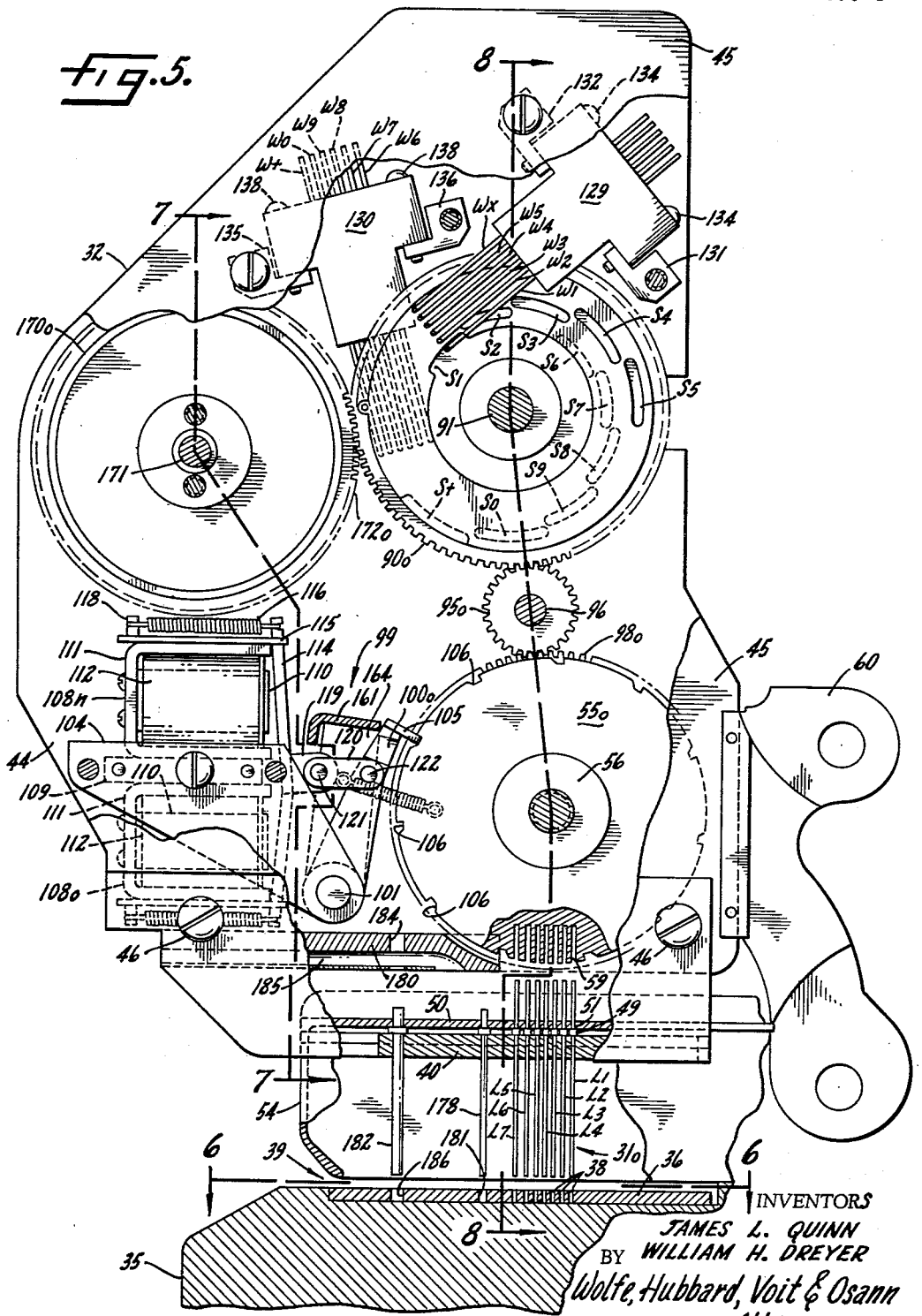

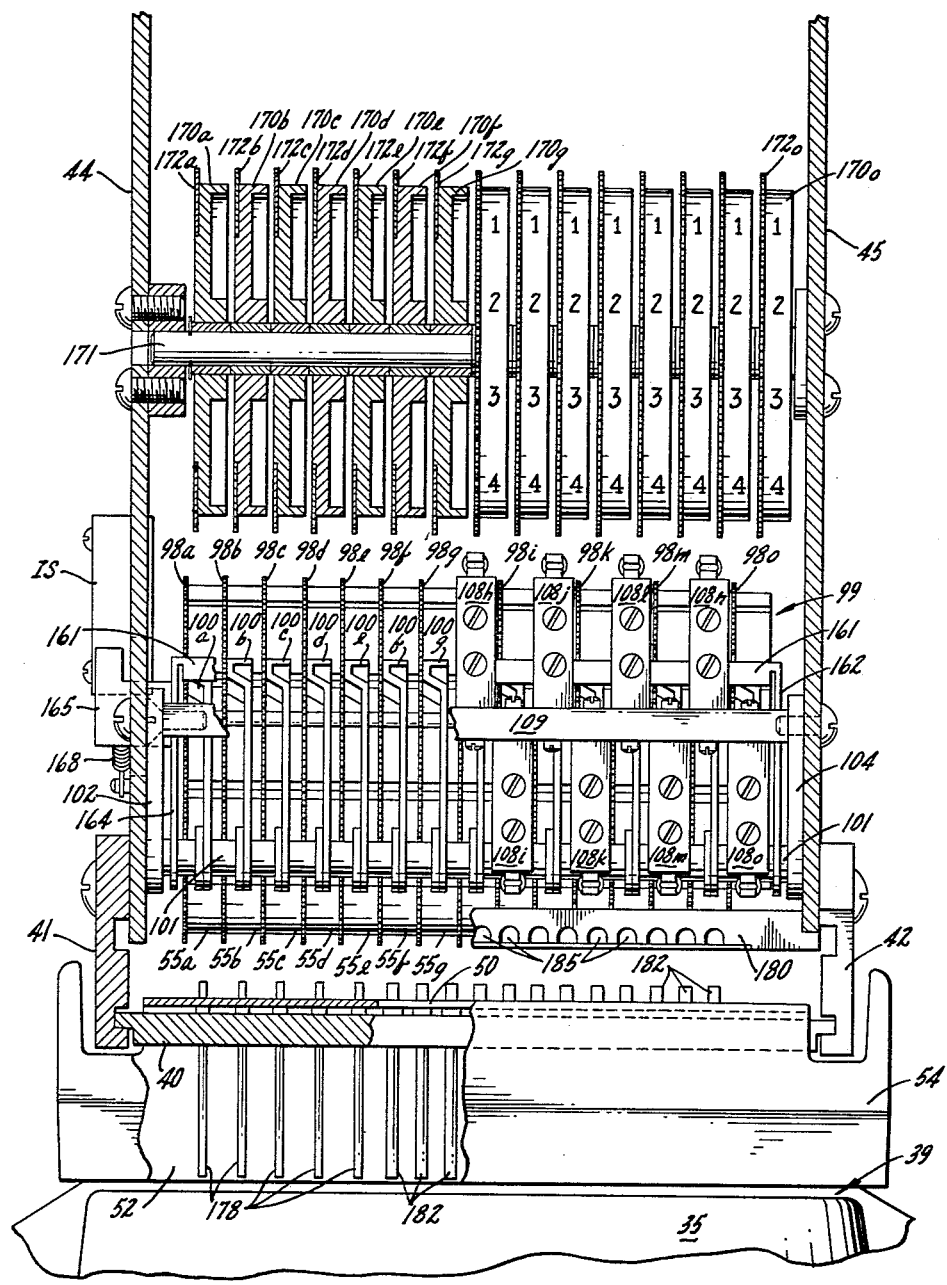

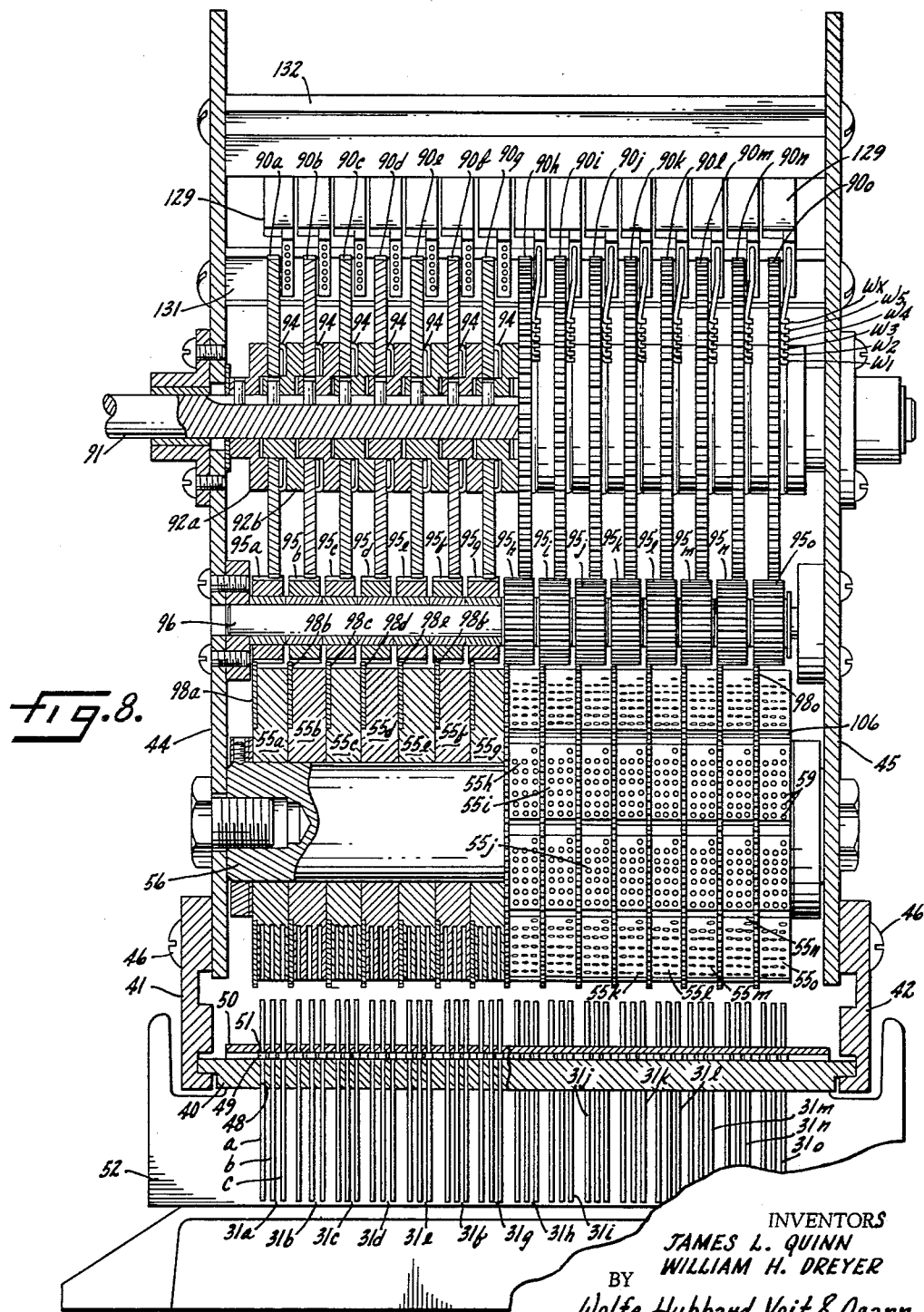

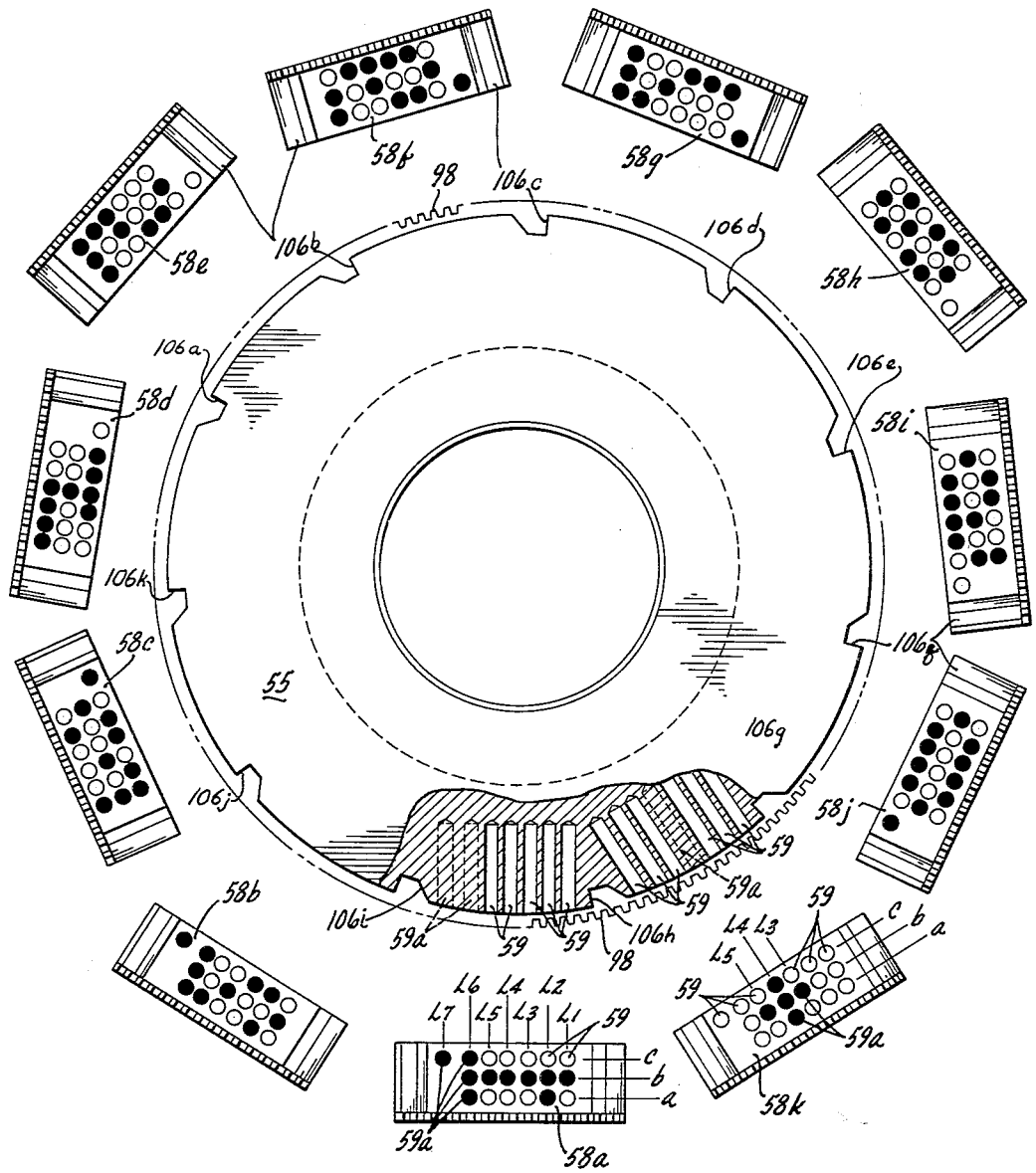

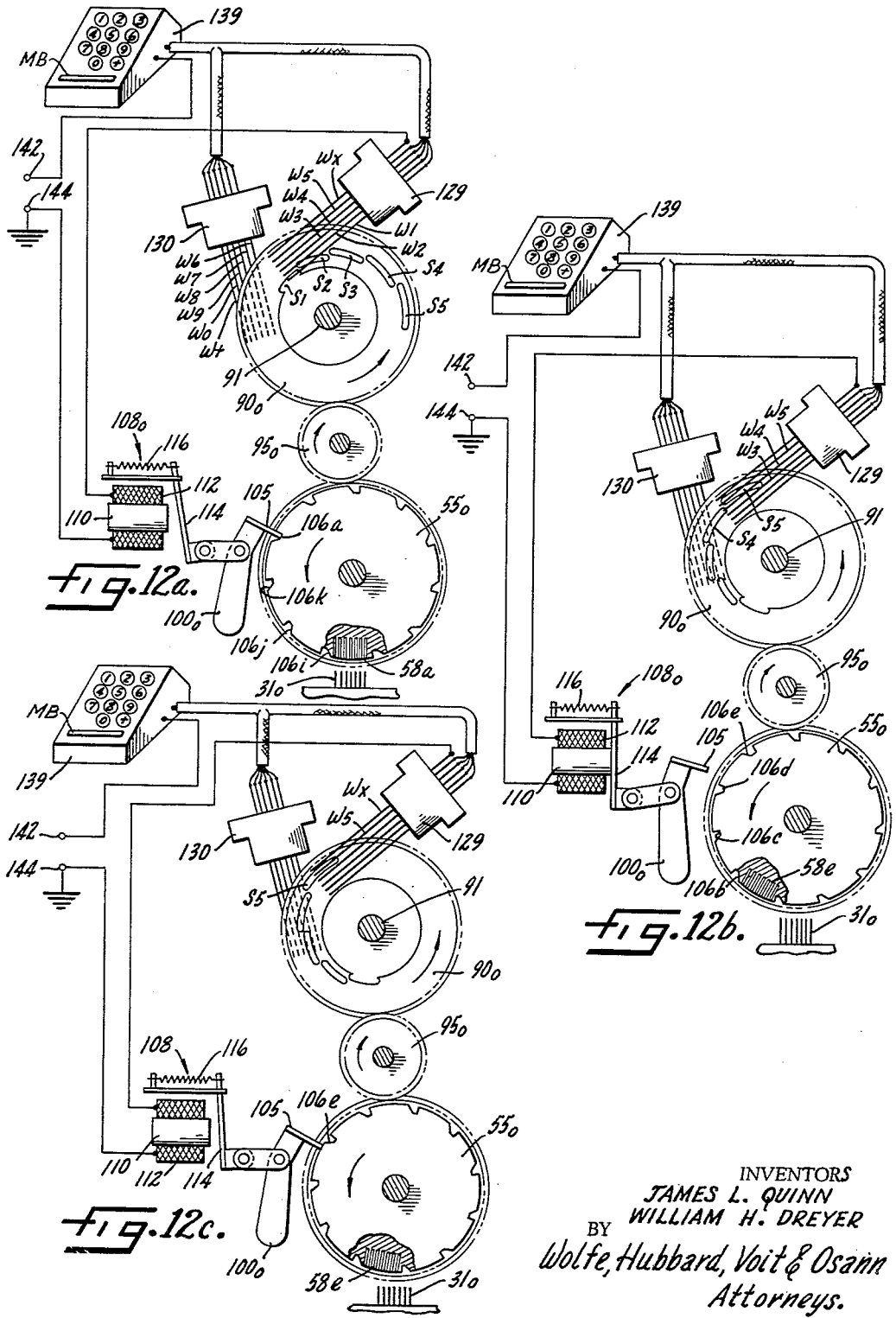

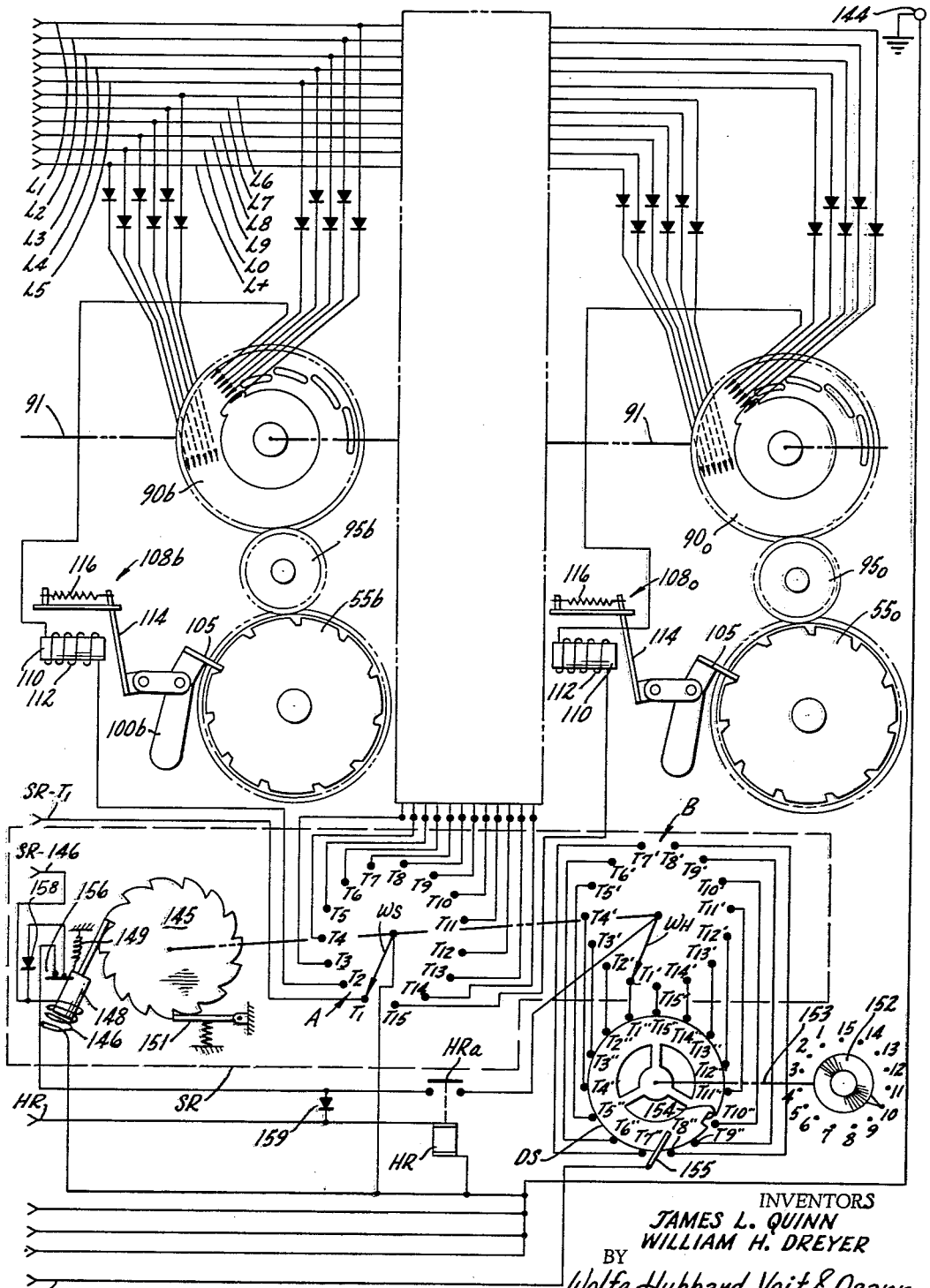

United States Patent Office 3,131,857
Patented May 5, 1964

3,131,857
PERFORATING APPARATUS
William H. Dreyer, Skokie, and James L. Quinn, Chicago, Ill., assignors to Cummins-Chicago Corp., Chicago, Ill., a corporation of Illinois
Filed Jan. 3, 1962, Ser. No. 164,128
13 Claims. (Cl. 234—100)

The present invention relates generally to apparatus for producing a predetermined pattern of perforations in a record medium such, for example, as account books or checkbooks, and more particularly, to perforating apparatus which may be quickly and conveniently set up to perforate holes representative of different characters or combinations of characters.

It is a general aim of the present invention to provide improved apparatus for producing a perforation field in a record medium.

More specifically, it is an object of the invention to provide perforating apparatus in which a rotatable coding matrix may be automatically indexed to a position suitable for drivingly engaging selected combinations of punches representative of particular characters by the simple expedient of selecting a character on a keyboard, thus promoting rapidity of operation.

Yet another object of the invention is to provide a keyboard controlled, rotatable indexing device which, while particularly suited for use in selectively positioning a coding matrix may find use in a wide variety of other indexing applications. In this connection, it is an object of the invention to provide an indexing device which is not only useful in positioning a coding matrix but which may be simultaneously used to index an indicating dial.

It is a related object of the invention to provide an indexing device characterized by its reliability in operation, yet which may be readily operated by untrained and unskilled personnel.

A further object of the invention is to provide a compact perforating head which is light in weight and which permits of economic fabrication.

It is another object of the invention to provide perforating apparatus which simultaneously applies a plurality of selected code characters to a record medium in response to successive signals received from a keyboard or the like, each signal designating one of the characters.

Yet another object of the invention is to provide a keyboard controlled perforating apparatus of the type employing a plurality of side-by-side rotatable indexing members each associated with different coding matrix and wherein each indexing member is successively and automatically conditioned for rotation through a selected angle as an incident to completion of the indexing movement of the preceding indexing member and its associated matrix.

In another of its aspects, it is an object of the invention to provide a keyboard controlled perforating apparatus which includes an adjustable digit selector for automatically enabling any one of a plurality of coding matrices for selective indexing.

More specifically, an object of the invention is to provide a keyboard controlled perforating apparatus of the type employing a plurality of side-by-side rotatable matrices wherein the perforating head is disabled until each matrix is properly oriented over the associated array of punches.

These and other objects of the invention are attained by the construction and arrangement shown as an exemplary embodiment in the accompanying drawings, in which:

FIGURE 1 illustrates a typical document having coded indicia applied thereto in the form of a plurality of arrays of closely spaced perforations;

FIG. 2 is a front elevation of a portion of a perforating machine embodying the features of the present invention with the cover of the perforating head partly broken away to illustrate the visual indicating dials employed therein;

FIG. 3 is a side view, partly in section, disclosing the drive arrangement for effecting relative movement between a perforating head embodying the features of the present invention and the supporting base;

FIG. 5 is a fragmentary vertical section illustrating the perforating head of the machine shown in FIG. 2;

FIG. 6 is a plan view taken substantially along the line 6—6 of FIG. 5 illustrating the die block configuration;

FIG. 7 is a fragmentary front elevational view with the left half of the perforating head shown as a sectional view taken substantially along the line 7—7 of FIG. 5;

FIG. 8 is a view similar to FIG. 7 with the left half of the perforating head shown as a sectional view taken substantially along the line 8—8 of FIG. 5, but with certain components omitted for purposes of clarity;

FIG. 9 is a fragmentary plan view of the right half of the perforating head with certain components omitted for the purpose of clarity and illustrating the compact organization of wipers associated with the opposed faces of the closely spaced, side-by-side indexing gears;

FIG. 10 is a detail view illustrating one of the coding matrices in elevation with the peripherally disposed die faces thereof shown in developed plan views to illustrate the various combination of punch receiving openings representative of particular characters;

FIGS. 12a–12c are stop-motion diagrammatic views illustrating an exemplary indexing cycle for one of the coding matrices and its associated indexing mechanism;

FIGS. 13a and 13b are fragmentary schematic wiring diagrams of the electrical controls for the perforating apparatus shown in FIG. 2; and, FIG. 14 is a fragmentary elevational view of a portion of the left side of the perforating head illustrating the interference actuating mechanism.

Figure 4:
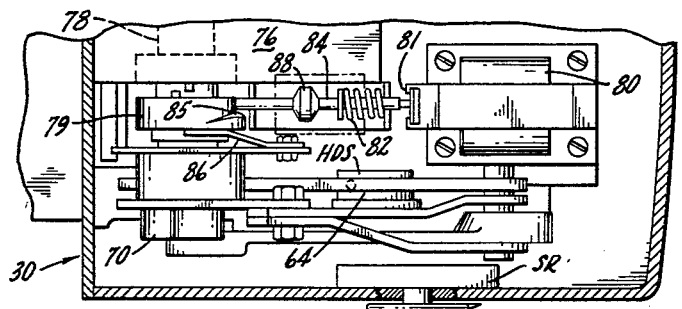
FIG. 4 is a fragmentary section taken substantially along the line 4—4 of FIG. 3, illustrating the mechanism employed for limiting operation to a single perforating cycle.

While the invention has been illustrated and will be described in detail with reference to a preferred embodiment thereof, there is no intention that it thus be limited to such detail. On the contrary, it is intended to cover all equivalent and alternative constructions which fall within the spirit and scope of the invention as defined by the appended claims.

Referring now to FIG. 1, a record medium is there shown as a typical commercial business document or money order 20, which is of conventional form with respect to the written or printed contents appearing in its lower area, but which also includes accounting information or the like in the form of a field 21 of character representative indicia. Such indicia, which preferably represents particular characters according to a predetermined code, has proven to be of great value in modern business accounting systems since it may be conveniently "read" by automatic business machines such as sorters, posting machines, computers or the like. This rapid and accurate mechanical handling of such record media, and processing of information applied thereto, is popularly referred to as "office automation." In the exemplary money order 20, the field 21 is in the form of a plurality of adjacent 3 x 6 arrays 22 of closely spaced perforations with the perforations in each array disposed at selected stations therein and representative of particular selected characters.

It will be understood as the present description proceeds that the particular code configuration employed to represent characters in each array is not critical to the invention. However, for purposes of clarity, the perforating apparatus will be described in connection with arrays of punches capable of being selectively driven through the record medium to form visually legible characters. Such perforated characters may be grouped to represent different accounting information, for example, an identifying money order number, the issuing agent and the amount. Thus, the exemplary perforation field 21 shown in FIG. 1 identifies the money order by the six digit number "321091," collectively represented by the group shown at 24; the issuing agent by the three digit number "017," collectively represented by the group shown at 25; and the amount by the six digit number "+83451" indicating $834.51, collectively represented by the group shown at 26.

It will be appreciated that coded indicia in the form of a field of closely spaced perforations located at selected stations in a plurality of adjacent arrays, with the selected combination of perforations in each array representative of a particular selected character, has particular utility in business documents of the type wherein it is desired to encode the same characters on a plurality of documents simultaneously. For example, such a perforation field may be simultaneously applied to each of the checks in a checkbook by driving selected punches through the checkbook.

The present invention is primarily concerned with an improved apparatus for applying indicia to a record medium, such as a money order 20, to represent characters according to a preselected code—in the exemplary form of the invention such characters are legibly represented in a plural-line code by selected combinations of perforations in side-by-side rectangular arrays thereof.

In carrying out the present invention, means are provided for simultaneously producing perforations in a record medium at selected stations in a plurality of side-by-side rectangular arrays. For this purpose, a plurality of punches (FIGS. 5 and 8) are arranged in adjacent rectangular arrays in a perforating apparatus, generally indicated at 30 (FIG. 2). In the illustrative form of the invention, the punches are arranged in fifteen identical 3 x 6 rectangular arrays $31_a$–$31_o$, there being eighteen such punches in each array located at stations in three vertical rows $a$, $b$, $c$ (FIG. 8) and six horizontal levels L1–L6 (FIG. 5). An additional punch is located in each array in row $c$ at level L7 for parity checking purposes. The punches are elongate in shape and are mounted with freedom for independent end-wise movement in a perforating head 32. The perforating head 32 is mounted on a frame 34 carried by the base 35 of the perforating apparatus 30 in such a manner as to have freedom for relative movement towards and away from the base 35 (FIG. 3), as will be described with greater particularity below.

In order to produce perforations in a record medium, such for example as a checkbook or the money order 20 shown in FIG. 1, the lower ends of all the punches in each array are adapted to be selectively passed through the medium during relative closing movement of the perforating head 32 and the base 35. To this end, a die block 36 (FIGS. 5 and 6), having a plurality of rectangular arrays of punch receiving openings 38 disposed in vertical rows $a$–$c$ and horizontal levels L1–L7 corresponding to the arrays of punches $31_a$–$31_o$, is mounted on the base 35—the upper surface of the die block being spaced from the plane defined by the lower ends of the punches by a transverse slot 39 formed in the base 35 to receive the medium to be perforated. When the record medium, for example, the money order 20, is fully inserted into the slot 39, it underlies the lower ends of the punches and is perforated by those punches which are selectively and affirmatively moved into their alined punch receiving openings 38 in the die block 36 during relative closing movement between the perforating head 32 and the base 35.

In order to support the punches in the perforating head 32 with freedom for limited end-wise movement relative to the perforating head, while simultaneously providing means for affirmatively withdrawing the punches from a perforated record medium, a transversely disposed stripper or lifter plate 40 (FIG. 8) is mounted on the perforating head. In the exemplary embodiment, the plate 40 is carried by a pair of downwardly depending hooks 41, 42 which are rigidly connected to the opposite side frames 44, 45 respectively of the perforating head 32, for example, by means of threaded fasteners 46. Each of the punches slidably extends through an opening 48 formed in the lifter plate 40 and each punch includes an integral, enlarged knob or stop 49 disposed intermediate the punch ends and positioned to normally rest on the upper surface of the lifter plate. Thus, not only does the lifter plate 40 support the punches for independent, limited end-wise movement within the openings 48, but moreover, it also affirmatively withdraws the punches from the record medium during relative opening movement between the perforating head 32 and die block 36.

To maintain the elongate punches in parallel relationship and properly oriented with respect to the openings 48 in the die block 36, the base 35 of the perforating apparatus 30 includes a transversely extending guide plate 50 (FIGS. 5, 7 and 8) provided with punch receiving openings 51 which are respectively alined with the openings 48 in the lifter plate 40 and which slidably receive respective ones of the punches. The guide plate 50 is parallel with and spaced from the lifter plate 40 and is rigidly mounted on a pair of upstanding ribs 52, 54 integral with the base 35.

To drive selective combinations of punches in each array $31_a$–$31_o$ through a record medium to form a plurality of perforated characters thereon, a plurality of coding matrices $55_a$–$55_o$ are rotatably mounted on a transverse support bar 56 carried by and rigid with the perforating head 32 and are respectively associated with the punch arrays $31_a$–$21_o$, there being one such matrix disposed over each array of punches (FIGS. 5 and 8). Each coding matrix 55 (FIG. 10) is generally disk-like in configuration and is formed with a plurality of peripherally disposed die faces, there being eleven such faces $58a$–$58k$ in the illustrative embodiment. Each die face is drilled to have a particular combination of punch receiving openings 59, with each combination of openings 59 in any one matrix being representative of a different character; i.e., the eleven die faces include eleven different patterns of punch receiving openings with each pattern uniquely representative of one of eleven different characters. Merely by way of example, a typical set of die faces and their associated patterns of openings have been illustrated in the development of FIG. 10, the patterns of openings in exemplary die faces $58a$–$58k$ being representative of the characters "1" through "0" and "+," respectively. The openings 59 are disposed in a generally rectangular 3 x 6 array of stations at levels L1–L6 in vertical rows $a$–$c$ corresponding to the 3 x 6 array of punches (see die face $58a$), with punch receiving openings 59 located at certain selected stations in any particular array. An additional opening 59 is located at row *c*, level L7 in the die faces 58*d*, 58*e*, 58*h*, 58*i* and 58*k*, the additional opening corresponding to the additional punch in each of the arrays $31_a$–$31_o$. The die face is solid, i.e., has no punch receiving openings at the remaining stations, as shown at 59*a* and represented by black circles. Referring for example, to the die face 58*k* representative of the character "+," it will be seen that no openings 59 are located in any vertical row at level L4, nor are any openings located in row *b* at levels L3 through L5 inclusive. Each remaining station is drilled to form a punch receiving opening. It will be appreciated that the die faces are solid, i.e., have no openings at those stations which are required to represent the different characters.

In keeping with the present invention, provision is made for reciprocating the entire perforating head 32 upwardly and downwardly relative to the base 35 of the perforating apparatus 30 when the coding matrices $55_a$–$55_o$ are oriented with selected die faces respectively disposed over the punch arrays $31_a$–$31_o$, thus driving those punches which find no punch receiving opening at the respective stations in the associated die face through the record medium to be perforated. To accomplish this, the perforating head 32 is rigidly mounted on a slide 60 (FIG. 3) which is supported by a pair of pins 61, 62 carried at the forward ends of a pair of parallel links 64, 65 respectively. The opposite ends of the links are respectively journalled on pins 66, 68 carried by the frame of the machine. The support of the perforating head 32 provided by the parallel links 64, 65 insures that the head will reciprocate up and down with a linear movement as an eccentric shaft 69 coupled by a pitman 70 to the link 64 executes one complete revolution. A worm gear 71 on the output shaft 72 of an electric motor 74 is meshed with a worm wheel 75 which is coupled through a suitable input shaft to a speed reducing gear box 76. As best shown in FIG. 4, the output shaft 78 of the gear box 76 forms the drive member of a one revolution clutch having a driven member 79 coupled directly to the eccentric shaft 69. Thus, when the drive member 78 and the driven member 79 of the one revolution clutch are coupled together, the eccentric shaft 69 is driven by the motor 74 through the speed reducing gearing 76. Rotation of the shaft 69 imparts linear vertical reciprocation to the perforating head 32 through the pitman 70 and the parallel links 64, 65.

To insure that the perforating head 32 will only move through one cycle of vertical reciprocation during each perforating operation, a clutch control solenoid 80, mounted on the frame of the perforating apparatus 30, is momentarily energized to retract its armature 81 against the bias of a spring 82. The armature 81 is rigidly connected to a clutch actuating pin 84, the opposite end of which is normally in abutment with a cam track 85 formed in the driven member 79 (FIG. 4). When the armature 81 is retracted against the bias of the spring 82, the pin 84 is withdrawn from abutment with the cam track 85 and the driven member 79 of the one revolution clutch is urged into coupled relationship with the driving member 78 by means of a leaf spring 86 or the like. As will be described with greater particularity in connection with the control circuitry shown in FIGS. 13*a* and 13*b*, means are provided for only momentarily energizing the solenoid 80. The bias provided by the spring 82 tends to urge the pin 84 back into engagement with the cam track 85 when the solenoid is deenergized, thus tending to uncouple the driving and driven clutch members. Retraction of the armature 81 also shifts a cam 88 formed thereon inwardly (FIG. 3), thereby actuating a motor control switch 89, the latter being deactuated as the eccentric shaft 69 completes one full revolution and the pin 84 snaps back into its original position in the cam track 85, thereby uncoupling the driving and driven clutch members.

In carrying out the present invention, a plurality of identical indexing mechanisms are provided for independently and successively rotating each coding matrix through a preselected angle about its support rod 56, so as to position a selected one of the die faces 58*a*–58*k* on each matrix over its associated array of punches. To this end, the indexing mechanisms include a plurality of rotatably indexable devices, here shown as gears $90_a$–$90_o$ (FIG. 8) which are carried by a transversely disposed drive shaft 91 journalled in the side frames 44, 45 of the perforating head 32, there being one such indexing gear associated with each of the coding matrices $55_a$–$55_o$. To maintain the indexing gears in spaced apart, side-by-side relation, a plurality of spacer clutch rings $92_a$–$92_o$ are respectively interposed between the gears and are rigidly mounted on the drive shaft 91 and rotatably driven thereby. The spacer rings not only serve to maintain the indexing gears in side-by-side spaced apart relationship, but in addition, they provide a slippable drive coupling between the drive shaft 91 and the various indexing gears. The drive shaft 91 is continuously driven by any suitable means, for example, an electric motor M (shown diagrammatically in FIGS. 13*a* and 13*b*). The respective indexing gears $90_a$–$90_o$ are urged into engagement with the associated spacer rings $92_a$–$92_o$ by means of springs 94 interposed between each gear and the next adjacent spacer ring. Thus, each set of spacer rings and springs serves as a slippable coupling for rotatably driving the associated indexing gear, provided the latter is not latched or otherwise inhibited from rotational movement.

In the exemplary form of the invention, provision is made for drivingly coupling the various indexing gears $90_a$–$90_o$ with respective ones of the decoding matrices $55_a$–$55_o$. To this end, the indexing gears $90_a$–$90_o$ are respectively meshed with pinion gears $95_a$–$95_o$, the latter being rotatably mounted on a support rod 96 carried by the perforating head 32 and interposed between the indexing gears and the coding matrices. Each coding matrix $55_a$–$55_o$ has rigidly secured thereto a radially projecting ring gear $98_a$–$98_o$, the teeth of the latter being respectively meshed with the pinion gears $95_a$–$95_o$. The gearing is arranged so that when any one of the indexing gears is driven by the drive shaft 91 through the associated slippable coupling, the corresponding one of the coding matrices is simultaneously rotated.

In order to inhibit rotation of the coding matrices and their associated indexing gears, a plurality of selectively releasable latching mechanisms, generally indicated at 99 (FIGS. 5 and 7), are respectively associated with each coding matrix and indexing gear 7. In the illustrative form of the invention, the latching mechanisms include stop levers $100_a$–$100_o$ which are pivotally mounted adjacent their lower ends on a transversely disposed support bar 101 carried by a pair of support brackets 102, 104 integral with the side frames 44, 45 respectively of the perforating head 32. Each stop lever includes a rearwardly projecting pawl 105 which is selectively received in one of a plurality of peripherally disposed notches 106 (FIG. 5) formed in the associated coding matrix 55, there being eleven such notches 106*a*–106*k* (FIG. 10) in each matrix corresponding to the eleven character-representative die faces 58*a*–58*k* respectively. It will be readily appreciated upon inspection of FIG. 5 that when the pawl 105 is engaged with one of the notches 106, the associated matrix (matrix $55_o$ in FIG. 5), is effectively prevented from rotating. Since the coding matrices are respectively coupled to the indexing gears, positive latching of the former also prevents rotation of the latter, thus causing the drive couplings between the shaft 91 and the indexing gears to slip.

Provision is made for selectively retracting each latching pawl 105 from engagement with one of the notches 106 formed in the associated coding matrix 55. To accomplish this, a very compact organization of magnetic actuators (actuators $108_h$–$108_o$ being shown in FIG. 7), here shown as magnetic actuators of the "clapper" type, are mounted on a transverse platform 109 rigidly secured adjacent its opposite ends to the support brackets 102, 104, there being one such actuator associated with each stop lever $100_a$–$100_o$. As best shown in FIG. 7, alternate magnetic actuators project downwardly from the lower surface of the mounting platform 109 while the intervening actuators are secured to the upper surface of the platform and extend upwardly therefrom. Each actuator includes a core 110 secured to a frame 111, the latter being mounted on the platform 109, for example, by threaded fasteners (FIG. 7). An energizing coil 112 is wound around each core (FIG. 5). A clapper 114 is pivotally connected adjacent one of its ends to one end of a pivot plate 115 secured to each frame 111. To urge the clapper away from the core material, a spring 116 is secured adjacent its opposite ends to the pivot end of the clapper 114 and a pin 118 secured to the opposite end of the pivot plate 115. A rearwardly projecting lug 119 is rigidly secured to the end of the clapper 114 remote from the pivotal connection to the pivot plate 115 and a connecting link 120 is pivotally secured at one end to the clapper lug 119 and at its other end to the stop lever (lever $100_o$ in FIG. 5) by means of pins 121, 122 respectively.

It will be appreciated that when one of the magnetic actuators is energized (for example, the actuator $108_o$), its clapper 114 will be attracted towards the core 110, thus causing the clapper to pivot about the associated pivot plate 115. As the clapper pivots, the stop lever $100_o$, which is coupled thereto by link 120, is drawn forwardly (to the left as viewed in FIG. 5) and the pawl 105 is disengaged from the notch 106 in the matrix $55_o$. Upon disengagement of the pawl, power is transmitted from the drive shaft 91 through the slippable coupling to the indexing gear $90_o$, thus causing rotation of the latter and its associated coding matrix $55_o$. When the magnetic actuator $108_o$ is deenergized, the spring 116 causes the clapper 114 to pivot in a counterclockwise direction, thus reengaging the pawl 105 with a different notch 106 formed in the coding matrix $55_o$ and stopping the latter with a new die face oriented over the punch array $31_o$. Of course, while the magnetic actuators have here been shown as of the "clapper" type, those skilled in the art will appreciate that other types of actuators could be used.

In accordance with one of the important aspects of the present invention, provision is made for momentarily releasing the coding matrix latching mechanisms one at a time and, during the period of momentary release for indexing the associated matrix through a desired rotational angle to properly orient a selected die face over the corresponding punch array. To accomplish this, a plurality of sets of sector contacts are carried by the perforating head, there being one set of contacts associated with each of the indexing gears. Each set of sector contacts includes one contact corresponding to each of the index positions for the associated gear. Provision is made for sequentially connecting the sector contacts in each set to the energizing coil for the associated latching mechanism, the latter being operated upon connection with an activated contact. In the exemplary perforating apparatus, the sector contacts are rotatably carried by each indexing gear. The contacts are formed by depositing an electrically conductive layer on each face of the gear, each layer including a set of sector contacts in the form of angularly related, radially spaced, non-conductive segments. Since the circuit configurations for all the indexing gears are identical, the present description will be directed solely to the indexing gear $90_o$ and its related circuit components, it being understood that the description is equally applicable to the remaining indexing mechanisms.

Figure 11:
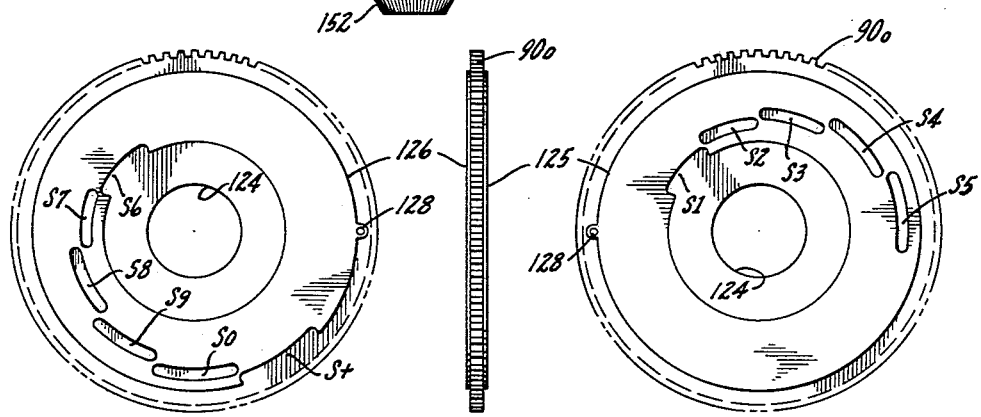
FIG. 11 is an end view illustrating one of the indexing gears in elevation with the opposed planar faces thereof shown in developed plan views to illustrate the printed circuit configurations thereon.

Referring to FIG. 11, it will be noted that the gear $90_o$ is generally disk-shaped in configuration and is provided with an axial opening 124 at its mid-point for reception of the drive shaft 91 and the hub of the adjacent spacer clutch ring, the opening 124 being sufficiently large to permit relative movement between the shaft and the gear when the latter is inhibited from rotating. Preferably, the gear is formed of a non-conductive material, such for example, as linen base Bakelite. The opposed planar surfaces of the gear have respectively formed thereon annular rings of electrically conductive material 125, 126 which, for example, may be copper cladding. The rings of cladding 125, 126 are electrically interconnected by drilling, or otherwise forming, an opening 128 extending through the non-conductive gear $90_o$ which opening is filled with the electrically conductive cladding material.

To provide suitable index positions for the various characters to be represented, the rings of cladding 125, 126 have formed therein a plurality of sector contacts, here shown as angularly related, radially spaced, arcuate, non-conductive segments, each representative of a different character index position. In the exemplary gear $90_o$ shown in FIG. 11, the ring of cladding 125 has formed thereon five such segments, identified as segments S1–S5, respectively corresponding to the index positions for the particular characters "1" through "5." Similarly, the ring 126 is provided with six such segments identified as segments S6–S9, S0 and S+, respectively corresponding to the index positions for the particular characters "6" through "9," "0" and "+." It will be apparent that the outer one-sixth of the ring of conductive cladding 125 is uninterrupted by any non-conductive segments—this portion of the ring serving as an output terminal for the indexing gear.

Of course, while the indexing gears have hereinabove been described as being formed of non-conductive material having annular rings of conductive cladding deposited thereon, those skilled in the art will readily appreciate that the gears could be formed of electrically conductive material having a plurality of angularly related, radially spaced, arcuate segments of non-conductive material deposited on each planar face. The illustrative form is preferable, however, since this type of an indexing gear readily lends itself to manufacture by conventional printed circuit techniques.

To sense the index position of the gear $90_o$, a plurality of wipers are carried by the perforating head 32 and positioned to respectively wipe across different ones of the contacts during rotation of the indexing gears. As best illustrated in FIG. 5, twelve such wipers are employed in the exemplary apparatus, there being eleven wipers W1–W9, W0 and W+ positioned to respectively wipe the eleven character representative, non-conductive segments S1–S9, S0 and S+. An additional wiper $W_x$ is positioned to make continuous electrical contact with the outer one-sixth of the ring of cladding 125. The wipers W1–W5 and $W_x$ are rigidly supported in parallel, spaced apart relation by a terminal block 129, while the wipers W6–W9, W0 and W+ are rigidly supported in parallel, spaced apart relation by a terminal block 130. The terminal block 129, together with the corresponding terminal blocks 129' (FIG. 9) for each of the remaining indexing gears $90_a$–$90_n$, are all secured to a pair of spaced, transverse support bars 131, 132 by means of threaded fasteners 134. The support bars are each rigidly secured adjacent their opposite ends to the side frames 44, 45 of the perforating head 32. In like manner, the terminal block 130, together with the corresponding terminal blocks 130' (FIG. 9) for each of the remaining indexing gears $90_a$–$90_n$, are all secured to a pair of spaced support bars 135, 136 by means of threaded fasteners 138—the support bars 135, 136 also being secured to the side frames 44, 45 of the perforating head 32. Each of the wipers is an elongate, electrically conductive, spring wire which is bent intermediate its ends so that the tip thereof makes continuous positive contact with the planar face of the associated gear, as best illustrated in FIG. 8.

Figure 13A:
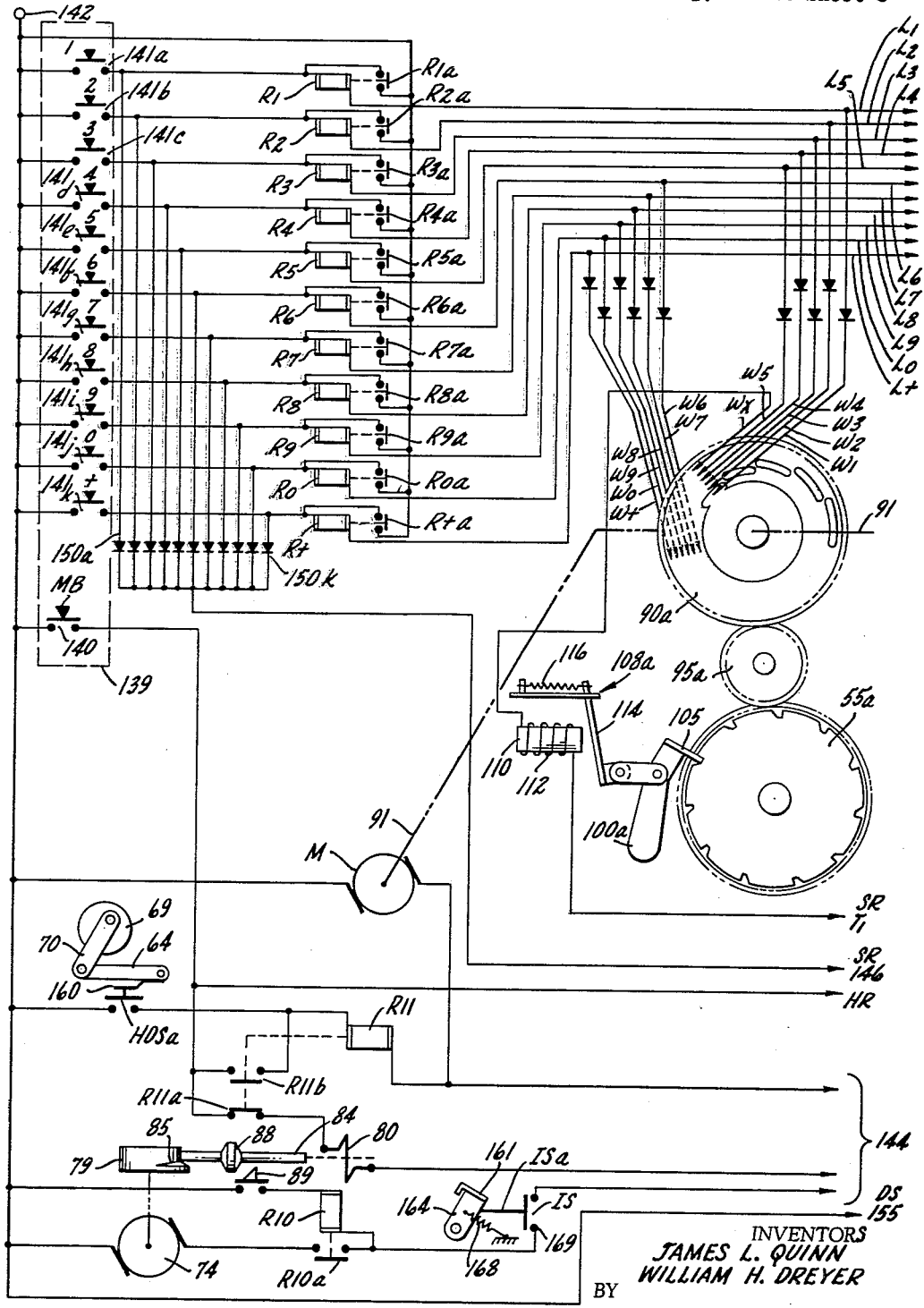

To facilitate an understanding of the present invention, an indexing cycle of operation will be briefly described in connection with the diagrammatic stop-motion views shown in FIGS. 12a–12c. Referring first to FIG. 12a, it will be seen that the elongate wipers W1–W9, W0 and W+ respectively associated with the character representative non-conductive segments S1–S9, S0 and S+ are each connected directly to a remotely operated keyboard 139. For a present understanding it is sufficient to state that the keyboard 139 (FIGS. 12a–12c and 13a) includes a plurality of selector keys each corresponding to one of the several characters to be represented by perforations, there being one key for each of the characters "0" through "9" and "+." Additionally, the keyboard 139 includes a motor bar MB having normally open switch contacts 140 associated therewith (FIG. 13a). Depression of any one character representative key closes an electrical switch 141a–141k (FIG. 13a) associated therewith. As best shown in FIG. 13a, one contact of each character selector switch is electrically coupled to the particular wiper associated with that character—for example, the wiper W1 is connected to one contact of the switch 141a associated with the key for representing the character "1." The other contact of each switch is connected directly to the positive terminal 142 of a D.C. voltage source (not shown). The wiper $W_x$, which is positioned to make continuous contact with the copper cladding 125 on the indexing gear, is connected to one terminal of the winding 112 of the magnetic actuator $108_0$ associated therewith, while the other terminal is connected directly to the ground terminal 144 of the D.C. source.

With the foregoing in mind, and assuming that the latching pawl 105 is engaged with the notch 106a (FIG. 12a), it will be apparent that the die face 58a on the coding matrix $55_0$ is properly oriented over the punch array $31_0$; i.e., the perforating apparatus 30 is conditioned to perforate the character "1" by proper selection of a particular combination of punches in the punch array $31_0$ when the perforating head 32 closes relative to the base 35. In this condition, the matrix $55_0$, pinion $95_0$ and indexing gear $90_0$ are all inhibited from rotation by virtue of engagement of the latching pawl 105 with the notch 106a. Consequently, slippage occurs between the spacer clutch ring $92_0$ and gear $90_0$. Let it next be assumed that the operator depresses the key representing the character "1" on the keyboard 139. Since this key is connected directly to wiper W1 and since wiper W1 is resting on the non-conductive segment S1, depression of the character "1" key does not complete any electrical circuit through the indexing gear and the gears $90_0$, $95_0$ and the coding matrix $55_0$ remains stationary. Thus, the perforating apparatus 30 remains conditioned to perforate the character "1."

However, it will be apparent upon inspection of FIG. 12a that only the wiper W1 is engaged with a non-conductive segment—all of the remaining wipers are in contact with the copper cladding 125 or 126. Consequently, depression of any other character representative key will complete an electrical circuit. Merely by way of example, let it be assumed that the operator depresses the key representative of the character "5"; i.e., the operator closes the switch contacts 141e (FIG. 13a), thus connecting the wiper W5 directly to the positive terminal 142. Current now flows from the positive terminal 142 through the now closed switch contacts 141e associated with the depressed key, wiper W5, copper cladding 125, wiper $W_x$, coil 112 of the magnetic actuator $108_0$, and back to the ground terminal 144. In this manner, magnetic actuator $108_0$ is energized and the clapper 114 is magnetically attracted towards the core 110, thus pivoting the stop lever $100_0$ in a counterclockwise direction and disengaging the pawl 105 from the notch 106a (FIG. 12b). Since the latching pawl is now disengaged, indexing gear $90_0$ and its associated matrix $55_0$ are free to rotate with the drive shaft 91.

Referring next to FIG. 12b, the indexing mechanism is shown just prior to engagement of the wiper W5 with the associated non-conductive segment S5. During the intervening period, the wiper W5 has been in continuous contact with the rotating copper cladding 125. Consequently, the matrix $55_0$ has continued to rotate in a counterclockwise direction (as indicated by the arrow in FIG. 12b) and the die face 58e (corresponding to the character "5") is now approaching the point of registration with the punch array $31_0$. At the instant that the wiper W5 engages the non-conductive segment S5, the energizing circuit for the coil 112 is broken and the spring 116 urges the clapper 114 to pivot in a counterclockwise direction, thus urging the pawl 105 into engagement with the peripheral surface of the matrix. However, at the instant the coil 112 is deenergized, the notch 106d (corresponding to a locking position for the character "4") has already passed the tip of the pawl 105. Since the pawl is not engaged with a notch, it freely rides along the surface of the matrix as the next notch 106e approaches.

The indexing mechanism is shown in FIG. 12c at the instant prior to engagement of the pawl 105 with the notch 106e. At this instant, the die face 58e (representative of the character "5") is not in precise alinement with the punch array $31_0$. However, the wiper W5 is still in engagement with the non-conductive segment S5 and the coil 112 remains deenergized. It will be appreciated that slight additional counterclockwise movement of the coding matrix will cause alinement of the notch 106e and the pawl 105, and the spring 116 will urge the latter into positive locking engagement with the notch, thus inhibiting rotation of the matrix $55_0$, pinion $95_0$ and indexing gear $90_0$. The die face 58e is now precisely alined with the punch array $31_0$; i.e., the perforating apparatus 30 is conditioned to perforate the character "5."

Of course, while the exemplary form of the invention has been described in connection with a plurality of wipers having their gear engaging tips alined in a linear array and positioned to successively wipe across angularly related, radially spaced, non-conductive segments on the gear, it will be readily appreciated that other arrangements can be utilized and still fall within the spirit and scope of the invention. For example, it would be possible to aline the diverse non-conductive segments on a common radii of the gear and to vary the length of the wipers so that the gear engaging tips of the latter respectively contact different radii of the gear at radially spaced points. The significant feature of the present invention is that the wipers and non-conductive segments are so related that the former respectively contact the latter in sequential order, which order is related to the angular position of the various die faces on the coding matrix.

In accordance with another of the important aspects of the present invention, commutating means are provided for automatically indexing each of the gears $90_a$–$90_o$ in sequential order in response to reception of a plurality of signals emanating from successive depression of selected keys on the keyboard, yet wherein each successive indexing gear is disabled until the preceding gear has completed its indexing movement. In the exemplary apparatus, the commutating means is shown as a spring-driven stepping relay SR having a selector deck A and a homing deck B, each including a plurality of terminals T1–T15 and T1'–T15' respectively (FIGS. 13a, 13b). The terminals T1–T15 are respectively connected to the energizing coils 112 of the magnetic actuators $108_a$–$108_o$ associated with the latching mechanisms for the corresponding indexing gears $90_a$–$90_o$. A stepping wiper $W_s$, connected directly to the ground terminal 144, is rotationally driven in step-by-step increments by means of a spring actuated ratchet wheel 145 and, during such step-by-step incremental movement, the wiper $W_s$ successively connects one side of each coil 112 to the ground terminal. Referring to FIGS. 13a and 13b conjointly, it will be seen that depression of any character representative key on the keyboard 139 simultaneously connects the wipers associated with that key for all of the gears $90_a$–$90_o$ directly to the positive terminal 142 of the D.C. source. Merely by way of example, should the key representative of the character "1" be depressed, the associated switch contacts 141a are closed and all of the wipers W1 are directly connected to the positive terminal 142. However, an electrical circuit can be completed through only one indexing gear since only one of the output wipers $W_x$ is connected to the ground terminal 144 through its coil 112 and the stepping deck A of the stepping relay SR. In the condition shown in FIGS. 13a, 13b, an electrical circuit will be completed through only the indexing gear $90_a$ since the stepping wiper $W_s$ is in contact with the terminal T1, and this circuit will be completed only when the wiper W1 is in contact with the copper cladding 125 on the gear $90_a$.

To provide step-by-step incremental movement of the relay SR, the wiper $W_s$ is drivingly connected to the ratchet wheel 145 for simultaneous rotation with the latter. To advance the ratchet wheel 145 in incremental steps, a solenoid is provided having a coil 146 and an armature 148—the armature being positioned to sequentially engage adjacent teeth on the ratchet wheel. The armature is urged to an extended position by means of a spring 149 connected at its opposite ends to the armature and the frame of the machine respectively. One side of the solenoid coil 146 is connected to each of the normally open switch contacts 141a–141k on the keyboard 139 through a plurality of asymmetrically conductive devices, here shown as diodes 150, there being one such diode connected to each set of switch contacts. The opposite side of the stepping coil 146 is connected directly to the ground terminal 144 of the D.C. source. Thus, each time a character representative key is depressed, an energizing circuit for the stepping coil 146 is completed. Upon energization of the coil 146, the armature 148 is retracted from engagement with one tooth on the ratchet wheel 145 and "picks-up" or engages the next successive tooth thereon. A spring biased keeper 151, pivotally mounted on the frame of the perforating apparatus 30 and engaging the teeth of the ratchet wheel 145 is utilized to prevent retrograde motion of the wheel during retraction of the armature. When the coil 146 is deenergized, for example, when the depressed key is released and its associated switch contacts reopen, the spring 149 urges the armature 148 to its extended position, thus moving the ratchet wheel 145 through one clockwise incremental step (as viewed in FIG. 13b) and advancing the stepping wiper $W_s$ to the next successive terminal. Thus, the stepping relay SR is of the type wherein the wiper $W_s$ does not advance until the coil 146 is deenergized. In this manner, the indexing gears $90_a$–$90_o$ are successively enabled one at a time, but only upon completion of proper indexing of the preceding indexing gear.

To insure that accurate indexing of each gear $90_a$–$90_o$ occurs even when a character representative selector key is only "tickled" or momentarily depressed, provision is made for inhibiting stepping of the relay SR until completion of rotational indexing of the preceding selected digital indexing gear. To this end, a plurality of holding relays R1–R0 and R+, having normally open contacts $R1_a$–$R0_a$ and $R+_a$, are respectively connected directly to the character representative switch contacts 141a–141k. The holding relays are electrically coupled to the wipers W1–W0 and W+ through conductors L1–L0 and L+ respectively, the conductors being connected to the respective wipers for each indexing gear. Should the operator only momentarily depress or "tickle" a particular key, for example the character "1" key, an energizing circuit is completed for the holding relay R1 (provided that the particular selected wiper W1, determined by the position of wiper $W_s$, is in contact with the conductive cladding on the indexing gear), thus closing the normally open contacts $R1_a$ and sealing in the relay R1 irrespective of whether or not the operator immediately releases the depressed key. The relay R1 remains sealed in until such time as the selected wiper W1 engages the associated non-conductive indexing segment S1, at which time the relay contacts $R1_a$ open and the sealing circuit is broken. During the holding period when the relay R1 is energized, an energizing circuit is also completed for the stepping relay SR through the closed relay contacts $R1_a$.

It will be apparent from the foregoing that for each successive depression of a character representative key, a different indexing gear and its associated coding matrix will be properly indexed. When the operator has properly conditioned all of the coding matrices $55_a$–$55_o$ to perforate selected characters, it is simply necessary to start the motor 74 by depressing the motor bar MB and initiating relative closing movement between the perforating head 32 and the base 35 thus effecting perforation of the record medium.

To permit indexing of any selected one of the digital indexing gear $90_a$–$90_o$, or any group thereof, preparatory to a perforating operation performed on a second record medium, provision is made for automatically "homing" or returning the stepping relay wiper $W_s$ to any selected one of the terminals T1–T15 on the selector deck A, as an incident to perforation of a first record medium. To this end, the terminals T1'–T15' of the homing deck B on the stepper relay SR are respectively connected to stationary terminals T1"–T15" associated with a manually adjustable digit selector ring DS carried by the frame of the perforating apparatus 30 (FIGS. 4 and 13b). The digit selector ring DS is manually rotated by means of an operating knob 152 mounted on a shaft 153 extending through and journalled in the frame of the perforating apparatus. A peripherally disposed notch 154 formed on the ring DS is positioned for selective registration with one of the terminals T1"–T15", thus placing the ring in contact with all the terminals T1"–T15" except the particular terminal registered with the notch 154. Additionally, the selector ring is connected directly to the positive terminal 142 of the D.C. source by means of a brush or wiper 155 positioned to make contact therewith (FIG. 13b).

The homing wiper $W_h$ associated with the homing deck B is physically connected with the ratchet wheel 145 for simultaneous rotation with the latter. The wiper $W_h$ is electrically connected to one side of the stepping coil 146 through a pair of normally open contacts $HR_a$ controlled by a homing relay HR, a set of interruptor contacts 156 associated with the stepping armature 148, and an asymmetrically conductive device, here shown as a diode 158. The opposite side of the stepping coil 146 remains coupled directly to the ground terminal 144. Energization of the homing relay HR is effected by depression of the motor bar MB on the keyboard 139, thus closing the normally open switch contacts 140 associated therewith and connecting one side of the relay HR directly to the positive terminal 142 of the D.C. source—the opposite side of the relay being connected to the ground terminal 144.

When the operator desires to condition only a particular one or group of matrices for indexing, it is merely necessary to turn the operating knob 152 of the digit selector DS to the desired digital position. For example, assume that the operator desired to perforate a different dollar amount in the group 26 (FIG. 1) in the next record to be perforated while leaving the other accounting information in groups of 24 and 25 unchanged. In this instance it is desirable to reset coding matrices $55_j$–$55_o$ while leaving the remaining matrices unchanged. To accomplish this the operator need only turn the knob 152 until the dial indicates that the notch 154 in the selector ring DS overlies terminal T10" (FIG. 13b). Under these conditions, when the operator energizes the perforating apparatus for the first record by depressing the motor bar MB, the homing relay HR is energized, closing normally open contacts $HR_a$ and completing an energizing circuit for the stepping coil 146 from the positive terminal 142 of the voltage source through the brush 155 and digit selector DS, the terminals $T1''$ and $T1'$, wiper $W_h$, now closed relay contacts $HR_a$, interrupter contacts 156, diode 158, coil 146 and back to the ground terminal 144. At the same time, the homing relay HR is sealed in by means of an asymmetrically conductive device, here shown as a diode 159, which is connected from the contacts $HR_a$ to the one side of the relay. Under these conditions, the stepping coil 146 is energized and the armature 148 retracted. Upon retraction of the armature, the interrupter contacts 156 open, deenergizing the stepping coil 146 and allowing the spring 149 to again extend the armature, advancing the ratchet wheel 145 and wipers $W_s$, $W_h$ one incremental step. When the armature is extended, the interrupter contacts 156 again close and a second energizing circuit for the stepping coil 146 is completed, this time through terminals $T2''$ and $T2'$. The stepping cycle is repetitive, each time advancing the wipers $W_s$ and $W_h$ one step, until such time as the wiper $W_h$ steps to terminal $T10'$. Since the terminal $T10'$ is connected directly to terminal $T10''$ and the latter terminal is registered with the notch 154 in the digit selector DS, the energizing circuit for the stepping coil 146 is broken. Simultaneously, the sealing circuit for the homing relay HR is broken and the relay is deenergized, thus reopening the normally open contacts $HR_a$.

When the operator desires to effect a perforating operation, it is merely necessary to depress the motor bar MB, thus closing the normally open switch contacts 140 associated therewith and completing the energizing circuit for the clutch control solenoid 80. Energization of the solenoid 80 causes withdrawal of the clutch control pin 84 from the cam track 85 in the driven clutch member 79 (FIGS. 3, 4 and 13a). As the pin 84 is withdrawn, the cam 88 formed thereon effects closure of the cam switch 89, completing an energizing circuit for the relay R10 which controls normally open motor contacts $R10_a$. Closure of the contacts $R10_a$ energizes the motor 74 and, through suitable reduction gearing 76 and through the one revolution clutch, causes rotation of the eccentric drive shaft 69, thus driving the perforating head 32 through a single downward and upward stroke. Upon completion of one full revolution of the eccentric drive shaft 69 and the one revolution clutch, the spring biased clutch control pin 84 snaps back into the cam track 85 on the driven clutch member 79, simultaneously uncoupling the one revolution clutch and opening the cam switch 89. When the cam switch 89 opens the relay R10 is deenergized, breaking the motor circuit for the motor 74.

To eliminate the possibility of the perforating head 32 moving through a second perforating cycle should the motor bar MB stick or should the operator continue to hold it in a depressed position, control means are provided for insuring that the motor 74 is deenergized upon completion of each cycle of operation. Referring to FIGS. 3 and 13a, this is accomplished by mounting a normally open head-down switch HDS on the frame of the perforating apparatus 30 responsive to the vertical position of the perforating head 32. A head-down switch actuator $HDS_a$ is disposed beneath a lever 160 interposed in the path of one of the parallel links, for example, link 64. Thus, as the perforating head 32 moves down, the lever 160 and the head-down switch actuator $HDS_a$ are depressed, closing the normally open head-down switch HDS and completing an energizing circuit for relay R11 which controls normally closed contacts $R11_a$ and normally open contacts $R11_b$. As soon as the relay R11 is energized, the contacts $R11_a$ open to deenergize the solenoid 80 controlling the driven member 79 of the one revolution clutch, and the contacts $R11_b$ close so that the relay R11 remains sealed in as long as the motor bar MB is depressed, thereby insuring that the clutch control solenoid 80 remains deenergized.

Figure 14:
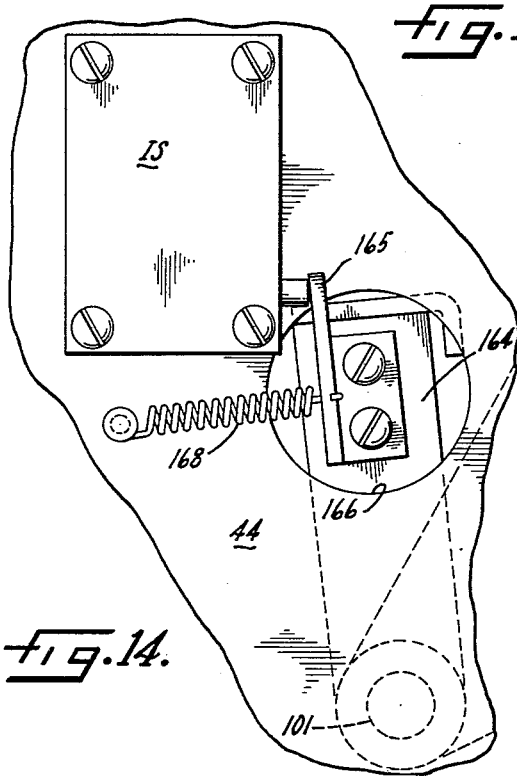

In accordance with a further important aspect of the present invention, provision is made for inhibiting initiation of a perforating cycle whenever any one or more of the coding matrices are, for any reason, improperly oriented; i.e., whenever the openings 59 in the die faces overlying the arrays of punches are not precisely alined with the punches. To accomplish this, a transversely disposed interference lever 161, having a pair of spaced depending wings 162, 164, is carried by the perforating head 32 (FIGS. 5 and 7)—the wings 162, 164 being pivotally mounted on the stop lever supporting bar 101. The interference lever 161 is positioned to engage the left hand or forward edge of each stop lever $100_a$–$100_o$ (as viewed in FIG. 5). A switch operating lever 165 is rigidly secured to the wing 164 (FIG. 7) and extends laterally therefrom through an enlarged aperture 166 formed in the side frame 44 with freedom for movement therein (FIG. 14). A spring 168, having its opposite ends rigidly secured to the frame 44 and the lever 165 respectively, urges the interference lever rearwardly (to the right as viewed in FIG. 5) and into engagement with the forward or left hand edge of the stop levers. An interference switch IS having an actuator $IS_a$ is rigidly mounted on the side frame 44 and positioned so that the switch actuating lever 165 will engage and depress the actuator $IS_a$ when all of the coding matrices have a die face accurately oriented relative to the underlying punch arrays (i.e., when all of the pawls 105 are received within a notch 106). In this condition, the contacts 169 (FIG. 13a) of the interference switch IS are closed and the energizing circuit for the motor 74 will be completed upon depression of the motor bar MB.

However, in the event that any one or more of the coding matrices $55_a$–$55_o$ are misaligned, the pawl 105 associated with that matrix or matrices will not be received within one of the peripherally disposed notches 106. Accordingly, that pawl 105 will engage the outer peripheral surface of the matrix and prevent the associated stop lever from pivoting rearwardly when the coil 112 of the associated magnetic actuator is deenergized. Since the stop lever associated with the misaligned matrix remains in its forward position, that lever will prevent pivotal movement of interference lever 161 and the interference switch IS will remain open. Referring to FIG. 13a, it will be seen that the interference switch contacts 169 are serially included in the energizing circuit for the motor 74. Consequently, in the event that any one or more of the coding matrices are misaligned, the switch contacts 169 will remain open and the motor 74 will remain deenergized, irrespective of the condition of the motor bar MB.

In accordance with still another aspect of the present invention, provision is made for visually indicating and identifying the index position of each coding matrix. To this end, a plurality of indicating dials $170_a$–$170_o$ are rotatably journaled on a transversely disposed support shaft 171 rigidly secured at its opposite ends to the side frames 44, 45 of the perforating head 32 (FIGS. 5, 7). The indexing dials have respectively secured thereto ring gears $172_a$–$172_o$ which are meshed with the corresponding indexing gears $90_a$–$90_o$. The various characters to be perforated are formed on the outer peripheral surface of the indicating dials (FIG. 7) at evenly spaced points. As best shown in FIG. 2, the cover 174 of the perforating head 32 has formed therein a plurality of windows $175_a$–$175_o$ through which the peripheral faces of the corresponding indicating dials are visible. It will be readily apparent that when an indexing gear is rotated, not only will the corresponding coding matrix be properly indexed, but in addition the corresponding indicating dial will be indexed. Upon completion of the indexing cycle for each gear $90_a$–$90_o$, a particular die face representative of a selected character is oriented over the corresponding punch array. That particular selected character is also visible on the corresponding indicator dial as viewed through the window. For example, as indicated by the dials $170_a$–$170_o$ in FIG. 2, each of the coding matrices are oriented with their die faces $58a$ (corresponding to the character "1") overlying the respective punch arrays.

To facilitate handling of a perforated record medium by automatic processing machinery, provision is made for simultaneously perforating a plurality of equally spaced sprocket holes therethrough as an incident to formation of the perforation field 21 (FIG. 1) in the medium. For this purpose a plurality of sprocket hole punches 178 (FIGS. 5 and 7) are mounted in the perforating head 32 in a manner similar to the punches in the character perforating arrays $31_a$–$31_o$. The punches 178 are located in front of the punch arrays $31_a$–$31_o$ and are slidably supported by the lifter plate 40 at equally spaced intervals for limited end-wise movement. For driving the punches 178 downwardly to form a linear array of sprocket holes 179 (FIG. 1) in the record medium 20, an elongate force plate 180 is rigidly mounted on the perforating head 32 in position to overlie the upper end of the punches. As the perforating head 32 closes relative to the base 35 during a perforating operation, the force plate 180 engages the upper ends of all of the sprocket hole punches and drives them downwardly through the record medium and into alined punch receiving openings 181 formed in the die block 36 (FIG. 6).

Often, it is desirable to form a perforation in a record medium indicative of the month. To this end, the perforating head 32 also includes twelve month punches 182 (FIGS. 5 and 7) which are supported by the lifter plate 40 at equally spaced intervals and which are located in front of the linear array of sprocket hole punches. The force plate 180 has formed therein twelve vertical openings 184 alined with the punches 182 for reception of the punches during a perforating operation. In order to selectively drive one of the month punches 182 through the record medium, provision is made for preventing a selected one of the month punches 182 from passing through its alined opening 184 in the force plate 180 during closing movement of the perforating head. This is accomplished by forming twelve parallel, horizontal slots or bores 185 in the force plate 180 which are open at the front of the machine (FIG. 2) and which respectively intersect the vertical openings 184. It will be evident upon inspection of FIG. 5 that when a special selector plug (not shown) is inserted into one of the slots 185, the month punch 182 alined with that particular slot will be prevented from moving through the vertical opening 184 and will, therefore, be driven downwardly by the force plate 180 through the record medium and into an alined punch receiving aperture 186 formed in the die block 36 (FIG. 6). To store the special selector plug when not in use, an additional slot or bore 188 which does not overlie any punch is formed in the force plate 180 (FIG. 2).

The operation of the perforating apparatus may be briefly summarized as follows:

Assuming that the operator wishes to perforate the numbers "321091" (representative of the exemplary money order number shown in FIG. 1), "017" (representative of the exemplary issuing agent), and "+83451" (representative of the amount), it is merely necessary that he place the money order 20 or other record medium in the transverse slot 39 formed in the base of the perforating apparatus 30 and sequentially select each digit of the three groups of numbers reading from left to right by punching the proper key on the keyboard 139. Before proceeding to punch the selector keys, the operator should insure that, as an incident to the previous perforating operation, the stepper relay SR has "homed" to the terminal T1 corresponding to the coding matrix $55_a$. This can be done simply by adjusting the digit selector knob 152 to the first digital position and depressing the motor bar MB prior to the insertion of the record medium to be perforated into the slot 39.

After adjusting the "home" position of the stepper relay SR and positioning the record medium, the operator depresses the character "3" key corresponding to the first digital number of the money order number (group 24 in FIG. 1) thereby completing an energizing circuit for the magnetic actuator $108_a$, releasing the latching mechanism associated with the coding matrix $55_a$ and rotatably indexing the matrix. When the non-conductive segment S3 on the indexing gear $90_a$ underlies the wiper W3, the energizing circuit for the magnetic actuator $108_a$ is broken and the coding matrix $55_a$ is relatched in condition to perforate the character "3." To insure that selection of the proper die face has occurred, it is merely necessary for the operator to glance at the indicator dial $170_a$ through the window $175_a$. Simultaneous with the deenergization of the magnetic actuator $108_a$, the stepping coil 146 is deenergized thus allowing the stepping wiper $W_s$ to move to terminal T2 corresponding to the coding matrix $55_b$ for the second digital number.

The operator next depresses a selector key for the character "2" and the foregoing steps are repeated to position matrix $55_b$ for perforation of the character "2." Coding matrix $55_c$ is enabled as an incident to indexing of the matrix $55_b$. The operator then sequentially depresses the designated selector keys for each of the remaining digits, thus positioning all of the coding matrices over their associated punch arrays in accordance with the character selected for perforation, at which point depression of the motor bar MB effects perforation of the money order.

However, before depressing the motor bar, it is desirable that the operator determine what information is to be perforated in other documents during subsequent perforating operations. If the same information is to be perforated in successive documents, it is merely necessary for the operator to depress the motor bar MB for each document inserted in the slot 39. However, if the operator wishes, for example, to identify successive documents by sequential identifying numbers (i.e., group 24 in FIG. 1), the selector knob 152 should be turned to the sixth digit position (corresponding to the unit digit in the identifying number group 24). Consequently, when each successive document is inserted into the perforating apparatus 30, it is merely necessary for the operator to select the proper die faces on the coding matrix $55_f$ in sequential order.

Having determined the nature of the information to be perforated in successive documents, the operator is now ready to effect perforation by depressing the motor bar MB. When the motor bar is depressed, normally open contacts 140 (FIG. 13a) are closed, energizing the clutch control solenoid 80 and withdrawing the clutch control pin 84 from the cam track 85 in the driven clutch member 79. As the pin 84 is withdrawn, the cam 88 formed thereon engages and closes the cam switch 89, completing an energizing circuit to the relay R10 which controls normally open motor contacts $R10_a$. Closure of the contacts $R10_a$ energizes the motor 74 which, through suitable reduction gearing and through the one revolution clutch, causes rotation of the eccentric drive shaft 69, thus driving the perforating head 32 through a downward and upward stroke. During the downward stroke, the selected die faces of the coding matrices register with the upper ends of the punches in the respective underlying punch arrays. Those punches, and only those punches, which engage a solid portion of each die face (as indicated at $59a$ in FIG. 10) are driven downwardly through the record medium. Simultaneously, the sprocket hole punches 178 are driven downwardly by the force plate 180 (and also a selected month punch 182 if desired). The chads punched out of the record medium are collected in a removable tray 189 which is mounted in the base 35 beneath the die block 36. Of course, if the openings in the selected die face of any one or more of the coding matrices are not precisely alined with the underlying punch array, the pawl 105 associated therewith will be prevented from pivoting into a peripheral notch 106 on the matrix. When this occurs, the interference lever 161 is inhibited from shifting rearwardly and the interference switch contacts 169 (FIG. 13a) remain open, thus preventing completion of an energizing circuit for the motor relay R10.

Upon completion of one full revolution of the eccentric drive shaft 69 and the one revolution clutch, the spring biased clutch control pin 84 snaps back into the cam track 85 on the driven clutch member 79, simultaneously uncoupling the one revolution clutch and opening the cam switch 89. When the cam switch 89 opens the relay R10 is deenergized, breaking the motor circuit. Simultaneous with the depression of the motor bar MB and energization of the clutch solenoid 80, an energizing circuit is completed for the homing relay HR. Upon energization, the homing relay is sealed in through its own contacts $HR_a$. Consequently, the stepping relay SR automatically "homes" to the terminal corresponding to matrix selected by the operator during adjustment of the digit selector knob 152.

Those skilled in the art will appreciate that the illustrative embodiment of the invention may be modified in numerous respects, yet still fall within the scope of the invention. For example, it would be entirely feasible to utilize the indicator dial shaft 171, the coding matrix shaft 56, or the pinion gear shaft 96 as a drive shaft, rather than the shaft 91 which rotatably supports the indexing gears. Moreover, it would also be possible to inhibit rotation by latching the indicating dial, the indexing gear or the pinion gear rather than the coding matrix.

It will be appreciated that the present perforating apparatus may be rapidly set up to perforate different patterns of holes representing different selected characters by the simple expedient of selecting keys sequentially on a keyboard. The apparatus is highly compact and versatile, and is susceptible to a wide range of uses since, by merely turning a digit selector knob, the operator may selectively position any coding matrix or any number of coding matrices. Moreover, it will be appreciated that the interference mechanism prevents downward movement of the perforating head in the event that one or more of the matrices are not properly oriented, thus effectively eliminating the danger of damage to the punches and the possibility of driving an entire array of punches through the record medium to be perforated.

We claim as our invention:

1. In a perforator or the like the combination comprising, a series of rotatable disks having individual magnetic latches associated therewith for maintaining the disks in any one of a plurality of selected indexed positions, means including individual slip clutches for driving the disks, a series of sector contacts rotatable with each of said disks, selector means for activating a selected one of said sector contacts for operation of the associated latch so that when the disk is driven to a position approaching the selected position the latch is actuated to positively stop the disk at the selected position, and commutating means actuated incident to the positioning of each disk for connecting the selector means to the sector contacts of the next disk in the series.

2. In a perforator or the like the combination comprising, a series of rotatable gears having individual magnetic latches associated therewith for maintaining the gears in any one of a plurality of selected indexed positions, means including individual slip clutches for driving gears, a series of sector contacts rotatable with each of said gears, selector means including a remote keyboard for activating a selected one of said selector contacts for operation of the associated latch so that when the gear is driven to a position approaching the selected position the latch is actuated to positively stop the gear at the selected position, and commutating means actuated incident to the positioning of each gear for connecting the selector means to the sector contacts of the next gear in the series so that all of the gears are remotely set in desired indexed positions.

3. In a perforator or the like the combination comprising, a series of rotatable disks each having a plurality of fixed stops rotatable therewith, a series of magnetic latches for maintaining the disks in any one of a plurality of selected indexed positions. each of said latches including means for positively engaging a selected one of the fixed stops on the associated disk, means including individual slip clutches for driving the disks, a series of sector contacts rotatable with each of said disks, selector means including a remote keyboard for activating a selected one of said sector contacts for operation of the associated latch so that when the disk is driven to a position approaching the selected position the latch is actuated to positively engage the selected fixed stop, and commutating means actuated incident to the positioning of each disk for connecting the selector means to the sector contacts of the next disk in the series so that all of the disks are remotely set in desired indexed positions.

4. In a perforator or the like the combination comprising, a series of rotatable disks having individual magnetic latches associated therewith for maintaining the disks in any one of a plurality of selected indexed positions, means including individual slip clutches for driving the disks, a series of sector contacts formed on at least one face of each of said disks, selector means including a remote keyboard for activating a selected one of said sector contacts for operation of the associated latch so that when the disk is driven to a position approaching the selected position the latch is actuated to positively stop the disk at the selected position, and commutating means actuated incident to the positioning of each disk for connecting the selector means to the sector contacts of the next disk in the series so that all of the disks are remotely set in desired indexed positions.

5. In a perforator or the like the combination comprising, a series of rotatable disks having individual magnetic latches associated therewith for maintaining the disks in any one of a plurality of selected indexed positions, means including individual slip clutches for driving the disks, a series of sector contacts rotatable with each of said disks, selector means including a remote keyboard for activating a selected one of said sector contacts for operation of the associated latch so that when the disk is driven to a position approaching the selected position the latch is actuated to positively stop the disk at the selected position, and commutating means for connecting the selector means to the sector contacts of the next disk in the series so that all of the disks are remotely set in desired indexed positions, said commutating means including a stepping relay having a series of terminals respectively coupled to different ones of said magnetic latches, a ratchet wheel, a wiper drivingly coupled to said wheel for rotational movement therewith, said wiper positioned to sequentially engage said terminals, and means for incrementally moving said ratchet wheel each time that one of said latches is actuated so that said wiper steps to the terminal coupled to the magnetic latch for the next disk in the series as an incident to positioning of each disk.

6. In a perforator or the like the combination comprising, a series of rotatable disks having individual magnetic latches associated therewith for maintaining the disks in any one of a plurality of selected indexed positions, means including individual slip clutches for driving the disks, a series of sector contacts rotatable with each of said disks, selector means including a remote keyboard for activating a selected one of said sector contacts for operation of the associated latch so that when the disk is driven to a position approaching the selected position the latch is actuated to positively stop the disk at the selected position, commutating means actuated incident to the positioning of each disk for connecting the selector means to the sector contacts of the next disk in the series so that all of the disks are remotely set in desired indexed positions, and means for automatically connecting the selector means to the sector contacts of any designated one of said disks when less than all of said disks are to be positioned.

7. An indexing device for selectively and rotationally indexing an associated coding matrix of the type having a plurality of peripherally disposed die faces with each die face including punch receiving openings corresponding to different particular characters, said device comprising, in combination, a keyboard having a plurality of character representative, selectively closable switches, an indexing gear, means for drivingly coupling said gear to the associated matrix, a ring of electrically conductive cladding formed on each face of said gear and defining a plurality of radially spaced, non-conductive segments on each face with each segment corresponding to a different one of said characters, a plurality of wipers respectively coupled to different ones of said character representative switches, certain of said wipers engaging the ring of cladding on one face of said indexing gear at radially spaced points and the remaining wipers engaging the other ring of cladding at radially spaced points, all of said wipers positioned to wipe across respective ones of the character representative non-conductive segments in sequential order, means for initiating rotation of said indexing gear upon actuation of a selected one of said character representative switches, and means for inhibiting rotation of said indexing gear when the wiper associated with said selected switch wipes across its associated non-conductive segment.

8. For use with a perforator or the like, a gear rotatable about an axis to selective index positions, said gear having its opposed planar faces formed of electrically conductive material, each of said opposed planar faces having a plurality of angularly related, radially spaced, non-conductive segments formed thereon with each of said non-conductive segments corresponding to a different index position.

9. For use with a perforator or the like, a gear rotatable about an axis to selective index positions, said gear formed of non-conductive material, an annular ring of electrically conductive material formed on each face of said gear, each of said rings having a plurality of angularly related, radially spaced, openings formed therein with said openings exposing a plurality of separate segments on said non-conductive gear with each segment corresponding to a different index position.

10. In a perforating apparatus, the combination comprising, a perforating head, a mounting rod extending transversely through said head, a plurality of disk shaped coding matrices rotatably mounted on said rod in side-by-side relationship, each of said matrices including a plurality of peripherally disposed die faces with the die faces in any one matrix each having a different combination of punch receiving openings formed therein, each of said combinations corresponding to a particular character, power means for rotationally driving all of said matrices, said power means including a plurality of slippable couplings each associated with a different one of said matrices, means for independently latching all of said matrices in a selectable one of diverse angular positions, means for successively and momentarily releasing said matrix latching means one at a time, and means for rotationally indexing each matrix through desired angular increments during the period of momentary release thereof to selectively position a particular character representative die face on each of said matrices.

11. In a perforating apparatus, the combination comprising, a perforating head, a mounting rod extending transversely through said head, a plurality of disk shaped coding matrices rotatably mounted on said rod in side-by-side relationship, each of said matrices including a plurality of peripherally disposed die faces with the die faces in any one matrix each having a different combination of punch receiving openings formed therein, each of said combinations corresponding to a particular character, power means for rotationally driving all of said matrices, said power means including a plurality of slippable couplings each associated with a different one of said matrices, means for independently latching all of said matrices in one of diverse selected positions, a keyboard including a plurality of selectively closable switches each corresponding to a different particular one of said characters, a stepping relay operatively associated with all of said matrices and adapted to enable the latter one at a time in sequential order, means for momentarily releasing the matrix latching means associated with an enabled matrix upon closure of a selected switch, means for rotationally indexing the enabled matrix through a desired angular increment during the period of momentary release thereof to selectively position a particular character representative die face, means for actuating said relay upon completion of indexing of one matrix so as to enable the adjacent matrix, and adjustable means for automatically enabling any selected one of said matrices as an incident to a perforating cycle.

12. In a perforating apparatus, the combination comprising, a perforating head, a mounting rod extending transversely through said head, a plurality of disk shaped coding matrices rotatably mounted on said rod in side-by-side relationship, each of said matrices including a plurality of peripherally disposed die faces with the die faces in any one matrix each having a different combination of punch receiving openings formed therein, each of said combinations corresponding to a particular character, power means for rotationally driving all of said matrices, said power means including a plurality of slippable couplings each associated with a different one of said matrices, means for independently latching all of said matrices in one of diverse selected positions, a keyboard including a plurality of selectively closable switches each corresponding to a different particular one of said characters, a stepping relay operatively associated with all of said matrices and adapted to enable the latter one at a time in sequential order, means for momentarily releasing the matrix latching means associated with an enabled matrix upon closure of a selected switch, means for rotationally indexing the enabled matrix through a desired angular increment during the period of momentary release thereof to selectively position a particular character representative die face, and means for actuating said relay upon completion of indexing of one matrix so as to enable the adjacent matrix.

13. Apparatus for applying character representative indicia in the form of perforations to a record medium comprising, in combination, a perforating head, a plurality of punches disposed in adjacent arrays of stations and carried by said head with freedom for limited endwise movement, a plurality of disk shaped matrix members respectively disposed above the upper end of said arrays of punches, said matrix members each having a plurality of peripherally disposed die faces with the die faces in each matrix member having different combinations of punch receiving openings disposed at stations corresponding to the underlying array of punch stations, each of said combinations corresponding to a particular character, a plurality of disk shaped indexing members carried by said head and drivingly coupled to respective ones of said matrix members for simultaneous rotation therewith, a plurality of disk shaped indicating members carried by said head and drivingly coupled to respective ones of said indexing members for simultaneous rotation with the latter, power means for rotationally driving all of said members, said power means including a plurality of slippable couplings respectively associated with different sets of said coupled matrix members, indexing members and indicating members, a plurality of latch means respectively associated with said coupled sets of members for inhibiting rotation of all of said members, a keyboard having a plurality of keys each representative of a different character to be perforated, means for sequentially releasing said latch means one at a time in response to successive actuation of designated keys, and means associated with said keyboard and said indexing members for reengaging said released latch means when the associated indexing members has rotated through an angular increment sufficient to effect registration of the array of stations in the character representative die face corresponding to the actuated key with the array of punches.

References Cited in the file of this patent

UNITED STATES PATENTS

| | | |
|---|---|---|
| 2,177,788 | Ross | Oct. 31, 1939 |
| 2,589,271 | Miller | Mar. 18, 1952 |
| 2,699,857 | Wales | Jan. 18, 1955 |
| 2,769,830 | Hilton | June 25, 1957 |
| 2,858,889 | Kent | Nov. 4, 1958 |
| 2,991,710 | Harwood | July 11, 1961 |
| 2,993,642 | Fender et al. | July 25, 1961 |